US010522064B2

(12) United States Patent
Taniguchi (10) Patent No.: US 10,522,064 B2
(45) Date of Patent: Dec. 31, 2019

(54) DISPLAY CONFIRMING DEVICE, LIQUID CRYSTAL DISPLAY DEVICE, METER DISPLAY, AND DISPLAY CONFIRMING METHOD

(71) Applicant: MITSUBISHI ELECTRIC CORPORATION, Tokyo (JP)

(72) Inventor: Hiroaki Taniguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 86 days.

(21) Appl. No.: 15/573,083

(22) PCT Filed: Jun. 1, 2015

(86) PCT No.: PCT/JP2015/065790
§ 371 (c)(1),
(2) Date: Nov. 9, 2017

(87) PCT Pub. No.: WO2016/194107
PCT Pub. Date: Dec. 8, 2016

(65) Prior Publication Data
US 2018/0122281 A1    May 3, 2018

(51) Int. Cl.
*G02F 1/1343* (2006.01)
*G02F 1/139* (2006.01)
(Continued)

(52) U.S. Cl.
CPC ........... *G09G 3/006* (2013.01); *G02F 1/1396* (2013.01); *G02F 1/134336* (2013.01);
(Continued)

(58) Field of Classification Search
CPC ...... F01L 3/14; G02F 1/1309; G02F 1/13338; G02F 1/134309; G02F 1/134336; G02F 1/134363; G02F 1/1362; G02F 1/1396; G02F 2001/136254; G02F 2201/12; G05B 1/00; G05B 6/00; G06F 2203/04107;
(Continued)

(56) References Cited

U.S. PATENT DOCUMENTS

2012/0038685 A1* 2/2012 Tanaka ................. G01C 21/265
345/690
2013/0300706 A1* 11/2013 Tun ....................... G06F 3/0412
345/174
(Continued)

FOREIGN PATENT DOCUMENTS

JP         2009-276612 A    11/2009

*Primary Examiner* — Hong Zhou
(74) *Attorney, Agent, or Firm* — Birch, Stewart, Kolasch & Birch, LLP (57) ABSTRACT

From a matrix electrode (2) provided for a liquid crystal display, a signal indicative of an amount of electric charges between a pair of electrodes that constitutes the matrix electrode (2) is inputted to an input unit (41). A comparison unit (42) compares that signal with a prestored signal indicative of an amount of electric charges between the pair of electrodes in the matrix electrode (2) measured when displaying has been performed normally by the liquid crystal display. A determination unit (43) determines whether a display on the liquid crystal display is normal or abnormal, using a comparison result by the comparison unit (42).

10 Claims, 5 Drawing Sheets

(51) Int. Cl.
*G06F 3/041* (2006.01)
*G06F 3/044* (2006.01)
*G09G 3/00* (2006.01)

(52) U.S. Cl.
CPC ............ *G06F 3/044* (2013.01); *G06F 3/0412* (2013.01); *G06F 2203/04107* (2013.01); *G06F 2203/04111* (2013.01); *G09G 2330/12* (2013.01)

(58) Field of Classification Search
CPC ......... G06F 2203/04111; G06F 3/0412; G06F 3/044; G09G 2330/12; G09G 3/006; G09G 3/20; G09G 3/36; G09G 3/3611
See application file for complete search history.

(56) References Cited

U.S. PATENT DOCUMENTS

| | | | |
|---|---|---|---|
| 2014/0203816 A1* | 7/2014 | Li | G02F 1/1309 324/537 |
| 2015/0294644 A1* | 10/2015 | Matsushima | G01C 21/365 345/589 |
| 2015/0309644 A1* | 10/2015 | Sun | G06F 3/0412 345/173 |
| 2016/0209962 A1* | 7/2016 | Nurmi | G06F 3/044 |
| 2016/0266677 A1* | 9/2016 | Liu | G06F 3/044 |
| 2016/0343328 A1* | 11/2016 | Li | G09G 3/3659 |

* cited by examiner

DISPLAY CONFIRMING DEVICE, LIQUID CRYSTAL DISPLAY DEVICE, METER DISPLAY, AND DISPLAY CONFIRMING METHOD

TECHNICAL FIELD

The present invention relates to a device and a method which are capable of confirming a display state of a liquid crystal display configured using a liquid crystal module.

BACKGROUND ART

With respect to a liquid crystal display configured using a liquid crystal module, as for a method of confirming whether an intended display content is displayed at a specified position, a camera-based system has heretofore been used. In this system, an image of the liquid crystal display is captured by a camera, and whether an intended display content is displayed at a specified position, is confirmed through image processing. However, this camera-based system has to provide a camera that is separate from the liquid crystal display, and is also required to make confirmation using image processing, so that its configuration is complicated.

As for a method of confirming a display by the liquid crystal display without using a camera, in Patent Literature 1, for example, such a configuration is disclosed in which, in addition to the provision of a display unit for displaying an image, a measurement unit for detecting a liquid crystal-aligned state of the display unit, on the basis of a change in electrostatic capacitance, to thereby output a measurement signal, is provided for each of pixel circuits.

CITATION LIST

Patent Literature

PTL1: Japanese Patent Application Laid-open No. 2009-276612

SUMMARY OF INVENTION

Technical Problem

However, according to the configuration disclosed in Patent Literature 1, an element, a wiring and the like, for detecting the electrostatic capacitance are required to be provided additionally for each of all of the pixel circuits, so that the light transmittance in the liquid crystal module decreases, and in addition, the pixel density is not allowed to increase. For that reasons, in a high-luminance or high-resolution liquid crystal display, the configuration of Patent Literature 1 cannot be employed, and thus, the range of applicable liquid crystal displays is narrow in the technology by Patent Literature 1.

This invention has been made to solve the problem as described above, and an object thereof is to provide a display confirming device for liquid crystal display, which does not use a separate camera or the like and thus has a relatively simple configuration, and which is applicable to a wide range of liquid crystal displays.

Solution to Problem

A display confirming device according to the invention is characterized by comprising: an input unit to which, from a matrix electrode provided for a liquid crystal display, a signal indicative of an amount of electric charges between a pair of electrodes that constitutes the matrix electrode, is inputted; a comparator to compare the signal inputted to the input unit, with a prestored signal indicative of an amount of electric charges between the pair of electrodes measured when displaying has been performed normally by the liquid crystal display; and a determiner to determine whether a display on the liquid crystal display is normal or abnormal, using a comparison result by the comparator.

Advantageous Effects of Invention

According to the invention, since the matrix electrode provided for the liquid crystal display is used, it is possible to perform display confirmation with a simple configuration without requiring a camera or the like. Further, since the comparison is carried out using the prestored signal, there is no need to provide an element, etc. for every pixel circuit and thus, the influence on the transmittance, etc. will be reduced, so that the invention can be applied to a wide range of liquid crystal displays.

DESCRIPTION OF EMBODIMENTS

Hereinafter, for illustrating the invention in more detail, an embodiment for carrying out the invention will be described in accordance with accompanying drawings.

Embodiment 1

Figure 1:
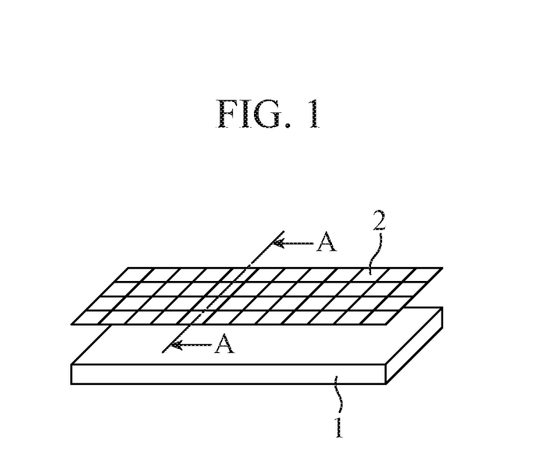
FIG. 1 is a diagram showing a placement relationship between a liquid crystal module and a matrix electrode, according to Embodiment 1 of the invention.

FIG. 1 is a diagram showing a placement relationship between a liquid crystal module 1 and a matrix electrode 2 that constitute a liquid crystal display according to Embodiment 1 of the invention. For example, the liquid crystal display device according to Embodiment 1 is provided in a vehicle and is used as a meter display for displaying a vehicle speed on a meter, or for displaying a display content indicative of each type of warning, such as a charge warning mark, a hydraulic pressure warning mark, an air-bag warning mark, or the like, as a still image or a blinking image, depending on the situation.

The liquid crystal module 1 is controlled by a later-mentioned display control unit 5 communicably connected to the liquid crystal module 1, to thereby display an image. The liquid crystal display is constituted by the liquid crystal module 1 and the display control unit 5.

The matrix electrode 2 is provided so as to cover the surface of the liquid crystal module 1. In the matrix electrode 2, plural driving electrodes and plural receiving electrodes are wired to cross orthogonally to each other, so that, at each of coordinate positions where the driving electrodes and the receiving electrodes are crossing to each other, a pair of electrodes is formed. To the driving electrode of the matrix electrode 2, a voltage is applied by a later-mentioned detection unit 3 that is communicably connected to the matrix electrode 2. The receiving electrode at the other side outputs, in accordance with an amount of electric charges between it and the driving electrode forming the pair therewith, a signal indicative of the amount of electric charges to the detection unit 3.

It is noted that the matrix electrode 2 is not limited to have a configuration in which plural driving electrodes and plural receiving electrodes are crossing orthogonally to each other as shown in FIG. 1, and may have a configuration in which plural driving electrodes and plural receiving electrodes are crossing diagonally to each other. Also, the positional relationship between the matrix electrode 2 and the liquid crystal module 1 is not limited to that in FIG. 1, and may be any positional relationship. Further, the principle of operation of the matrix electrode 2 is the same as that of a conventional electrostatic touch panel of a mutual capacitance type. Namely, a conventional electrostatic touch panel of a mutual capacitance type may be employed as the matrix electrode 2.

Figure 2A:
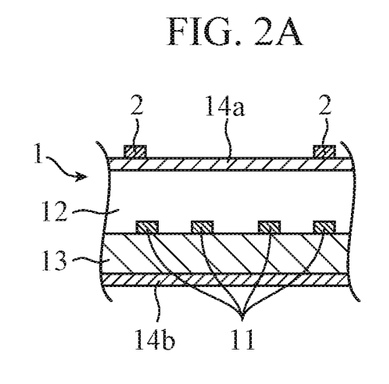
FIGS. 2A and 2B are cross-sectional views of the liquid crystal module and the matrix electrode, according to Embodiment 1 of the invention.
Figure 2B:
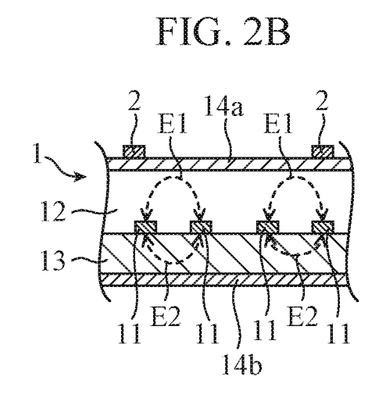

FIGS. 2A and 2B are cross-sectional views each showing the liquid crystal module 1 and the matrix electrode 2 provided on the surface thereof. The cross-sectional view shows a cross section when the liquid crystal module 1 and the matrix electrode 2 are cut along A-A line in FIG. 1.

What is shown in FIGS. 2A and 2B is a liquid crystal module 1 of a type in which a liquid crystal molecule is switched by being turned in a plane in parallel to the display surface, which is known, for example, as an IPS (In Plane Switching (registered trademark)) type. The liquid crystal module 1 of this type has: plural TFT (Thin Film Transistor) electrodes 11 arranged on one plane; liquid crystal 12 composed of liquid crystal molecules whose aligned state changes by electric fields induced by the TFT electrodes 11; an insulating layer 13 for the TFT electrodes 11 that is provided in a side that is, as viewed from the TFT electrodes 11, opposite to the liquid crystal 12; and two glasses 14*a*, 14*b* by which the TFT electrodes 11, the liquid crystal 12 and the insulating layer 13 are sandwiched therebetween.

FIG. 2A shows an OFF state of the liquid crystal module 1, in which no voltage is applied to the TFT electrodes 11. On this occasion, in the display screen of the liquid crystal module 1, its screen portion corresponding to the TFT electrodes 11 to which no voltage is applied, is provided as a black picture.

FIG. 2B shows an ON state of the liquid crystal module 1, in which voltages are applied to the TFT electrodes 11. Because the voltages are applied to the TFT electrodes 11, electric fields E1 are induced and thus, the aligned state of the liquid crystal 12 changes, so that an image is displayed.

Note that, when the voltages are applied to the TFT electrodes 11, electric fields E2 are also induced on the side of the insulating layer 13.

The application of the voltages to the TFT electrodes 11 is controlled by a later-mentioned display control unit 5.

Electric charges generated at the receiving electrode of the matrix electrode 2 will change depending on the nearby electric field. Accordingly, when the electric field E1 is induced by the nearby TFT electrodes 11, the matrix electrode 2 outputs a current corresponding to an amount of electric charges between each pair of electrodes that has changed due to the electric field E1, to a later-mentioned detection unit 3, as a signal indicative of a change in electric charge. The density of the pairs of electrodes that are provided in the matrix electrode 2 may be equal to or less than the pixel density of the liquid crystal display. In this manner, a change in a state of the TFT electrodes 11, namely, the display state of the liquid crystal module 1, is detected by the matrix electrode 2 as a change in current.

Figure 3:
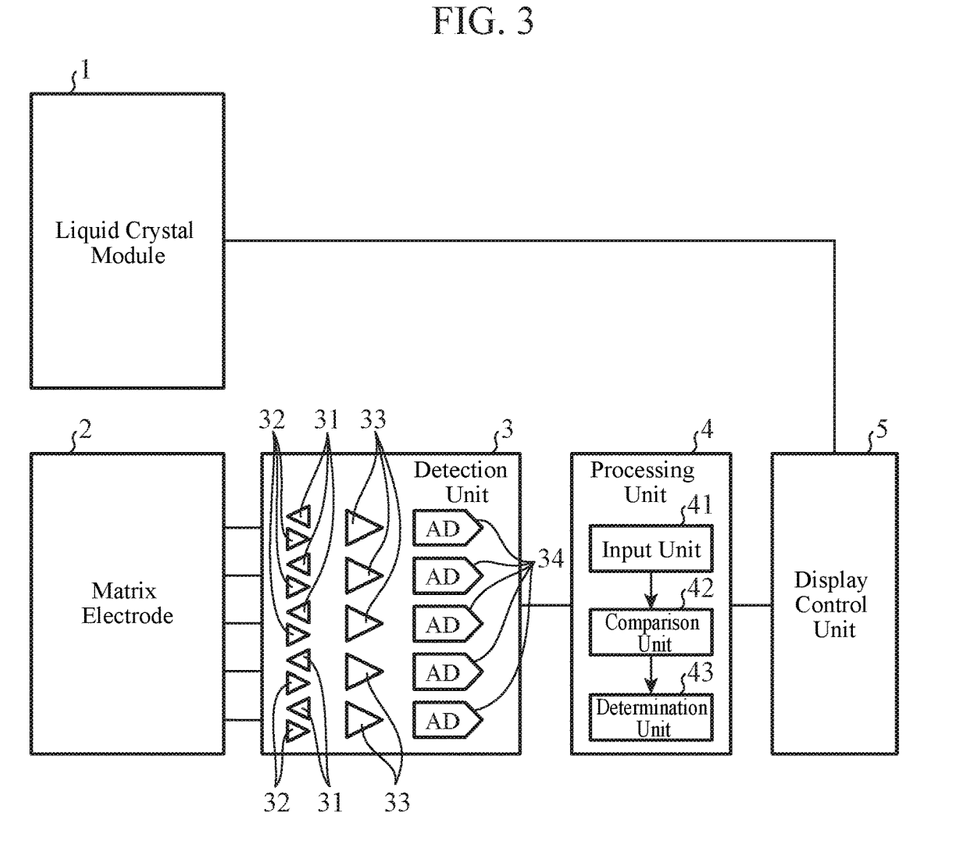
FIG. 3 is a configuration diagram of a liquid crystal display device according to Embodiment 1 of the invention.

FIG. 3 is a block diagram showing a configuration of the liquid crystal display device according to Embodiment 1 of the invention.

The detection unit 3 operates the matrix electrode 2 to thereby acquire each signal indicative of the amount of electric charges between each pair of electrodes. Then, the detection unit 3 processes the acquired signal, and outputs the processed signal to a processing unit 4. The detection unit 3 is configured, for example, with: a drive 31 for applying a voltage to the matrix electrode 2; an input unit 32 for acquiring, from the matrix electrode 2, each signal indicative of the amount of electric charges between each pair of electrodes; an amplifier 33 for amplifying the signal acquired by the input unit 32; an AD converter 34 for analog-to-digital converting the signal amplified by the amplifier 33 and outputting the converted signal as a detection signal to the processing unit 4; and the like.

The processing unit 4 determines, using the detection signal outputted by the detection unit 3, whether an intended display content is displayed at a specified position on the liquid crystal module 1. The processing unit 4 has an input unit 41, a comparison unit 42 and a determination unit 43.

In a state where an instruction for displaying the intended display content subject to display determination/confirmation, is fed to the liquid crystal module 1, each signal indicative of the amount of electric charges between each pair of electrodes in the matrix electrode 2, is outputted as a detection signal to the input unit 41 through the detection unit 3 from the matrix electrode 2.

The comparison unit 42 compares the detection signal inputted to the input unit 41 with a detection signal to be detected when the intended display content is displayed normally at the specified position. As the detection signal to be detected when the intended display content is displayed normally at the specified position, for example, a signal actually measured at the time of the operation test, etc. of the liquid crystal display device, is prestored for each pair of electrodes in the matrix electrode 2 in an unshown memory. The comparison unit 42 compares each detection signal that is stored in the memory and that is indicative of the amount of electric charges between each pair of electrodes in the matrix electrode when displaying is performed normally, with each detection signal inputted to the input unit 41 with respect to each pair of electrodes, and then outputs the comparison result to the determination unit 43, for example, as a difference in signal value at each pair of electrodes.

For example, using the comparison result from the comparison unit 42 and a preset threshold value indicative of an allowable difference in signal value that shows a normal range, the determination unit 43 determines whether the intended display content is displayed normally at the specified position on the liquid crystal module 1. The determination result by the determination unit 43 is outputted to the display control unit 5 that applies voltages to the TFT electrodes 11 of the liquid crystal module 1 to thereby cause the liquid crystal module 1 to operate.

A display confirming device is constituted by the processing unit 4. Further, the liquid crystal display device is constituted by the liquid crystal module 1, the matrix electrode 2, the detection unit 3, the processing unit 4 and the display control unit 5.

In the case where the liquid crystal display device shown in FIG. 3 is, for example, a meter display for a vehicle, the processing unit 4 detects whether an unshown entire-vehicle control unit outputs an instruction for displaying any warning mark. For example, when an instruction for displaying an air-bag warning mark indicating an abnormality of an air-bag system, is detected, then, a prestored detection signal acquired when the air-bag warning mark has been displayed and the detection signal acquired from the detection unit 3 are compared with each other in the comparison unit 42, and determination is made by the determination unit 43. Accordingly, it is confirmed whether the air-bag warning mark that is a display content for indicating an abnormality of the air-bag system, is normally displayed and presented to a user.

The determination result by the determination unit 43 in the processing unit 4 is outputted to the display control unit 5. According to the determination result by the determination unit 43, the display control unit 5 causes the liquid crystal module 1 to display a message.

It is noted that, other than to the meter display, the configuration of Embodiment 1 is similarly applicable, for example, to an indicator display in a building maintenance system for monitoring the operational status of equipment in a building, for the purpose of confirming whether an warning mark is displayed normally. Further, other than an warning mark that is to be displayed only when an abnormality occurs, a mark that is to be displayed always at a specified position may be subject to display confirmation. In any case, the processing unit 4 confirms whether an intended display content is displayed at a specified position, by using the detection signal that is indicative of the amount of electric charges and that is outputted from the detection unit 3.

Further, the processing unit 4 may acquire information about the display content that the display control unit 5 is going to display, from the display control unit 5, to thereby recognize the display content subject to display confirmation.

Each of the functions of the input unit 41, the comparison unit 42 and the determination unit 43 in the processing unit 4 is implemented by a processing circuit. The processing circuit may be special hardware, or may be a CPU (Central Processing Unit) that executes programs stored in a memory. The CPU is referred to also as "central processing device", "processing device", "arithmetic device", "microprocessor", "microcomputer", "processor" or "DSP (Digital Signal Processor)".

Figure 4A:
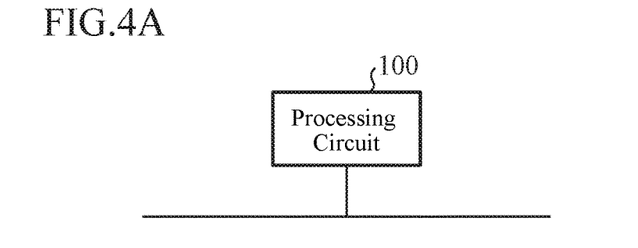
FIGS. 4A and 4B are diagrams each showing an example of hardware configuration of a processing unit according to Embodiment 1 of the invention.

FIG. 4A is a diagram showing a hardware configuration when the functions of each unit in the processing unit 4 are implemented by a processing circuit 100 as special hardware. The processing circuit 100 corresponds to, for example, a single circuit, a composite circuit, a programmed processor, a processor programmed in parallel, an ASIC (Application Specific Integrated Circuit), an FPGA (Field Programmable Gate Array), or any combination among them. The functions of each unit of the input unit 41, the comparison unit 42 and the determination unit 43 may be implemented by individual processing circuits 100 in combination, or the functions of each unit may be implemented by a single processing circuit 100.

Figure 4B:
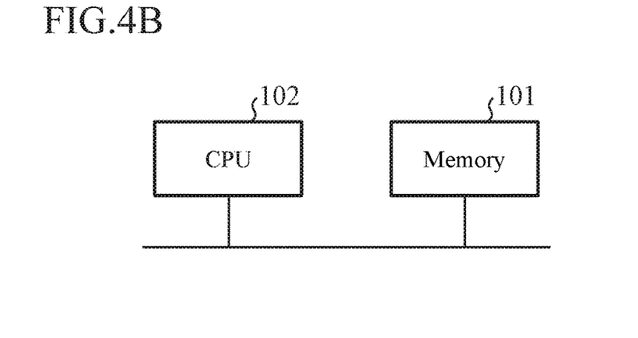

FIG. 4B is a diagram showing a hardware configuration when the functions of each unit in the processing unit 4 are implemented by a CPU 102 that executes programs stored in a memory 101. In this case, the functions of each unit of the input unit 41, the comparison unit 42 and the determination unit 43 are implemented by software, firmware or a combination of software and firmware. The software and the firmware are written as programs and stored in the memory 101. The CPU 102 reads out and executes the programs stored in the memory 101 to thereby implement the functions of each unit in the processing unit 4. Namely, the processing unit 4 has the memory 101 for storing the programs by which Steps ST2 to ST6 shown in a later-mentioned flowchart in FIG. 5 will be executed consequently. Also, these programs can be said to be those which cause a computer to execute the procedures and methodologies of each unit in the processing unit 4. Here, the memory 101 corresponds to, for example, a non-volatile or volatile semiconductor memory, such as a RAM, a ROM, a flash memory, an EPROM (Erasable Programmable ROM), an EEPROM (Electrically Erasable Programmable ROM) or the like, a magnetic disk, a flexible disk, an optical disc, a compact disc, a mini disc, a DVD (Digital Versatile Disc), and the like.

The display control unit 5 can also be implemented by a hardware configuration similar to that of the processing unit 4.

Next, an example of processing by the liquid crystal display device configured as described above will be described using the flowcharts shown in FIG. 5 and FIG. 6.

The processing unit 4, when detects that an intended display content is going to be displayed, notifies the detection unit 3 of that effect. For this purpose, for example, in the case of a meter display for a vehicle, the processing unit 4 monitors whether an instruction for displaying an warning mark is outputted from the unshown entire-vehicle control unit. Instead, the processing unit 4 may acquire from the display control unit 5, information about the display content that the display control unit 5 is going to display, to thereby detect whether the intended display content is going to be displayed, on the basis of that information.

Figure 5:
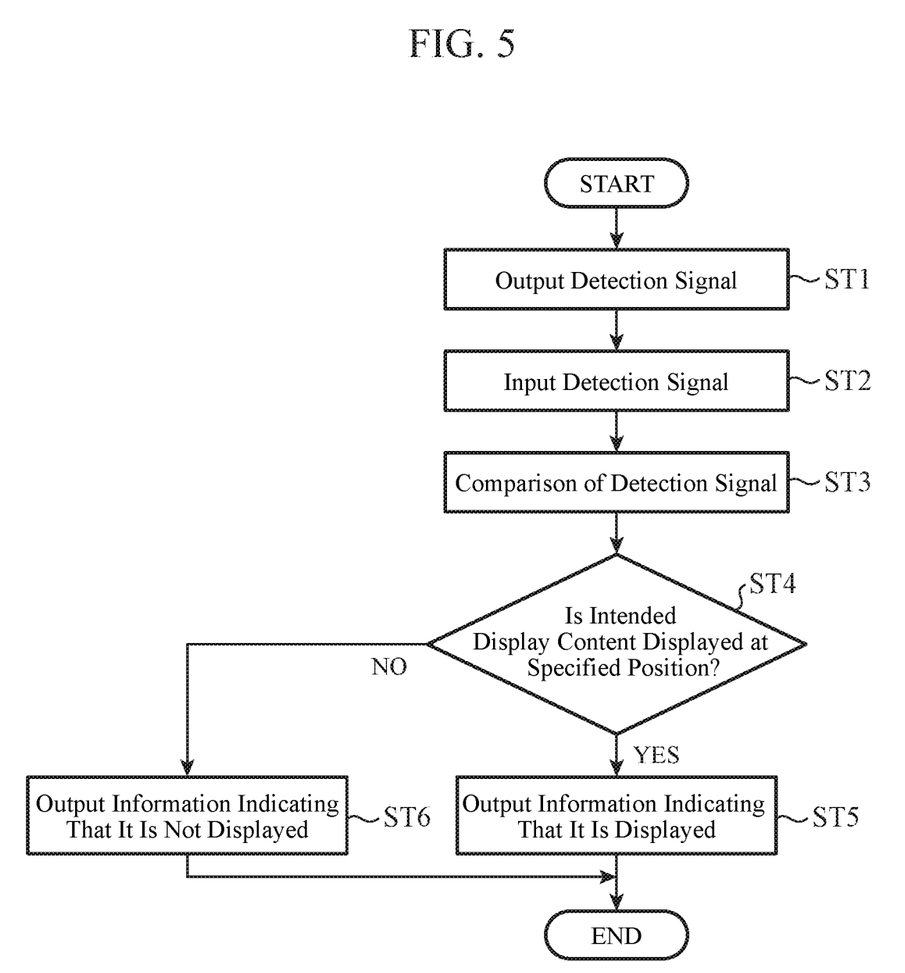
FIG. 5 is a flowchart showing processing by the liquid crystal display device according to Embodiment 1 of the invention.

Then, as shown in FIG. 5, firstly, the detection unit 3 operates the matrix electrode 2 to thereby acquire each signal indicative of an amount of electric charges between each pair of electrodes, and outputs the signal as a detection signal to the processing unit 4 (Step ST1).

Subsequently, the detection signal outputted by the detection unit 3 is inputted to the input unit 41 in the processing unit 4 (Step ST2).

Subsequently, the comparison unit 42 in the processing unit 4 compares the detection signal inputted to the input unit 41 with a prestored detection signal (Step ST3). The comparison result is outputted to the determination unit 43.

Subsequently, using the comparison result outputted in accordance with the processing in Step ST3 and a preset threshold value, the determination unit 43 in the processing unit 4 determines whether the intended display content is displayed at a specified position on the liquid crystal module 1 (Step ST4).

When the determination unit 43 in the processing unit 4 determines that the intended display content is displayed at the specified position on the liquid crystal module 1 (Step ST4; YES), the determination unit 43 in the processing unit 4 outputs the determination result of that effect to the display control unit 5 (Step ST5).

In contrast, when the determination unit 43 in the processing unit 4 determines that the intended display content is not displayed at the specified position on the liquid crystal module 1 (Step ST4; NO), the determination unit 43 in the processing unit 4 outputs the determination result of that effect to the display control unit 5 (Step ST6). On this occasion, the display control unit 5 causes the liquid crystal module 1 to display a message indicating that the intended display content is not displayed at the specified position on the liquid crystal module 1, to thereby make the user recognize that effect. Further, it is allowed to construct such a system that includes the liquid crystal display device and by which a warning sound is outputted through an unshown speaker to thereby, as a whole, make the user recognize that effect.

The processing of confirming whether the intended display content is displayed at the specified position on the liquid crystal module 1 in a manner as shown in Steps ST1 to ST6, is performed periodically. It is particularly efficient when the processing is performed with the same period as the display period of the liquid crystal module 1.

Figure 6:
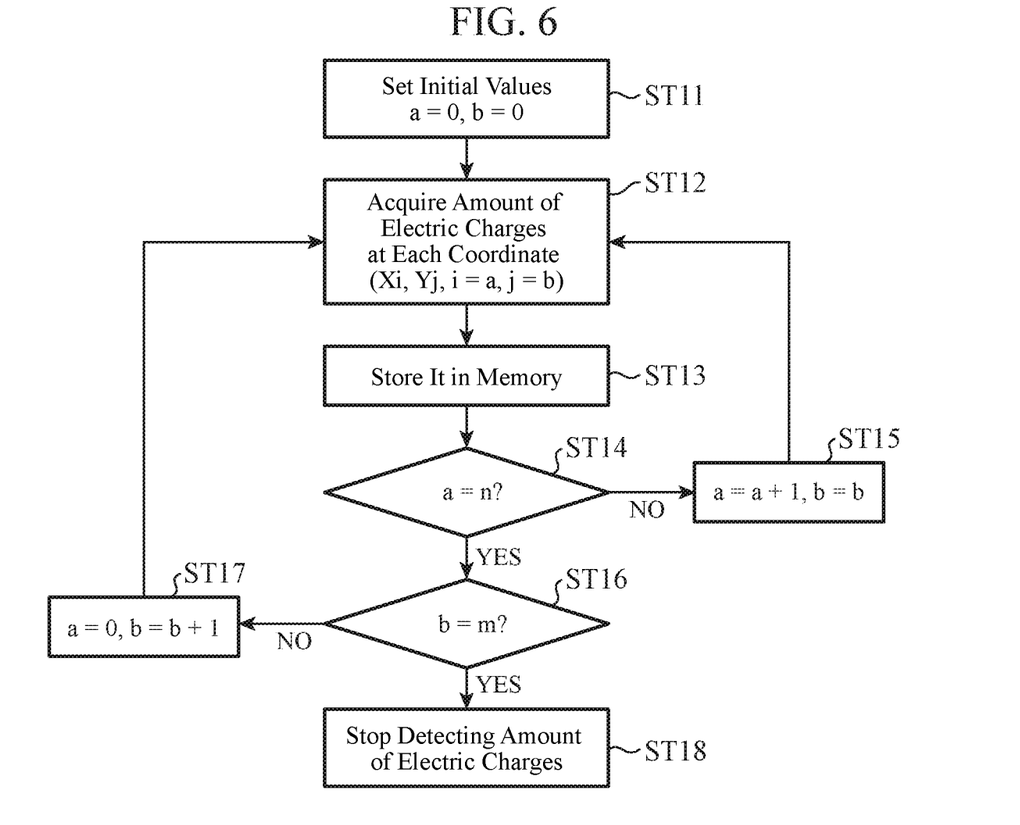
FIG. 6 is a flowchart showing in detail apart of the processing shown in FIG. 5.

FIG. 6 shows details of the processing in Step ST1 shown in FIG. 5.

The position of each pair of electrodes in the matrix electrode 2 is represented by a coordinate ($X_i$, $Y_j$), where $i=0, \ldots, a, \ldots, n$, and $j=0, \ldots, b, \ldots, m$. Note that a, b, n and m are each an integer of 0 or more, and n and m are constants resulting from subtracting 1 from the maximum numbers of pairs of electrodes in both X and Y directions.

Firstly, the detection unit 3 assigns $a=0$ and $b=0$, to thereby set initial values for the coordinates of the pairs of electrodes that are subject to detection of the electric charges (Step ST11).

Subsequently, the detection unit 3 drives the driving electrode forming the pair of electrodes at the coordinate of ($X_i$, $Y_j$, $i=a$, $j=b$) to thereby acquire a signal indicative of the amount of electric charges between the pair of electrodes, through its corresponding receiving electrode (Step ST12).

Subsequently, the detection unit 3 performs amplification, analog-to-digital conversion and the like, on the signal acquired in Step ST12, and temporarily stores in the unshown memory, a value indicated by the acquired signal after that conversion. At this time, the value is stored to be associated with the coordinate information of the pair of electrodes (Step ST13).

Subsequently, the detection unit 3 determines whether the variable number "a" used in the processing satisfies $a=n$ (Step ST14).

When $a=n$ is not satisfied (Step ST14; NO), the detection unit 3 assigns $a=a+1$, and $b=b$ (Step ST15), and then returns to the processing in Step ST12.

In contrast, when $a=n$ is satisfied (Step ST14; YES), the detection unit 3 determines whether $b=m$ is satisfied (Step ST16).

When $b=m$ is not satisfied (Step ST16; NO), the detection unit 3 assigns $a=0$, and further $b=b+1$ (Step ST17), and then returns to the processing in Step ST12.

In contrast, when $b=m$ is satisfied (Step ST16; YES), the detection unit 3 stops detecting the amount of electric charges (Step ST18). Then, the detection signals each indicative of the value associated with the coordinate information of the pair of electrodes and stored in accordance with the processing in Step ST13 are outputted to the processing unit 4. Each of these detection signals substantially indicates the amount of electric charges between each pair of electrodes in the matrix electrode 2.

In this manner, using the matrix electrode 2, a display state of the liquid crystal module 1 is detected as a change in the amount of electric charges in the matrix electrode 2, and whether the intended display content is displayed at the specified position is determined by the processing unit 4.

It is noted that, in the above description, such a case is shown in which the detection unit 3 temporarily stores detection signals each indicative of the amount of electric charges between each pair of electrodes, and outputs, after acquiring the detection signals of all pairs of electrodes, these detection signals together to the processing unit 4. However, in Step ST12, at every time a signal indicative of the amount of electric charges between one pair of electrodes is acquired, the signal may be processed and outputted accordingly to the processing unit 4 as a detection signal associated with the coordinate information of that pair of electrodes.

Figure 7A:
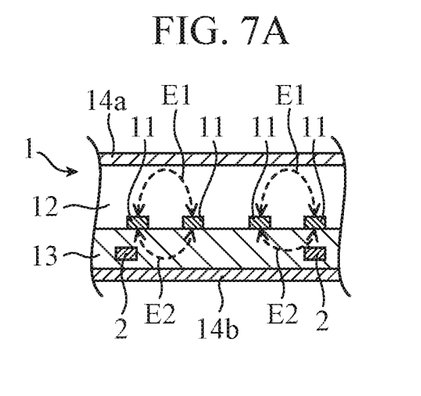
FIGS. 7A and 7B are cross-sectional views showing first and second modified examples of the liquid crystal display device according to Embodiment 1 of the invention.

FIG. 7A is a cross-sectional view when the matrix electrode 2 is incorporated in the insulating layer 13 of the liquid crystal module 1. Even when so arranged, the matrix electrode 2 can detect the electric field E2 developed by the TFT electrodes 11 as a change in the amount of electric charges, so that the display content can be confirmed by the processing unit 4.

Figure 7B:
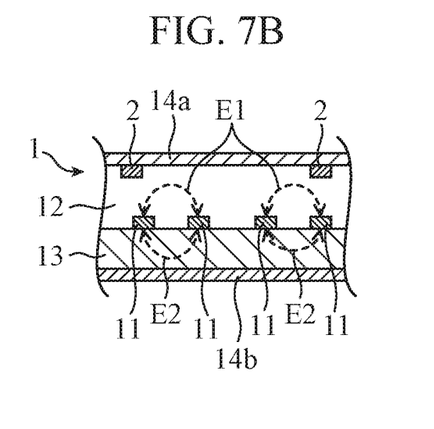

Further, FIG. 7B is a cross-sectional view when the matrix electrode 2 is provided, as viewed from the glass 14*a*, not on the outer side, but on the inner side. Even when so arranged, the matrix electrode 2 can detect the electric field E1 developed by the TFT electrodes 11 as a change in the amount of electric charges, so that the display content can be confirmed by the processing unit 4.

In summary, it suffices that the matrix electrode 2 is provided at a position where it is subject to influence of the electric field developed by the TFT electrodes 11.

Figure 8:
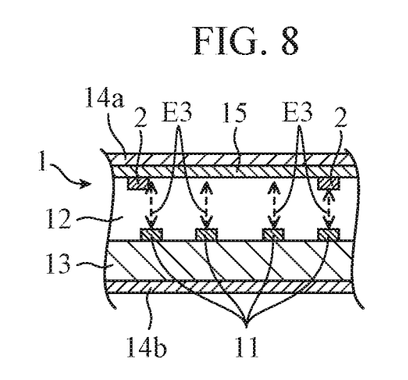
FIG. 8 is a cross-sectional view showing a third modified example of the liquid crystal display device according to Embodiment 1 of the invention.

Meanwhile, FIG. 8 is a cross-sectional view when the liquid crystal module 1 is of a TN (Twisted Nematic) type. In the liquid crystal module 1 of a TN type, plural TFT electrodes 11 arranged on one plane are placed opposite to another plural TFT electrodes 15 also arranged on one plane, across the liquid crystal 12. When the liquid crystal module 1 is of a TN type, the matrix electrode 2 is provided between the TFT electrodes 11 and the TFT electrodes 15. When voltages are applied to the TFT electrodes 11, 15, electric fields E3 are developed between the mutually facing TFT electrodes 11, 15, so that the aligned state of the liquid crystal molecules changes. The matrix electrode 2 provided between the TFT electrodes 11 and the TFT electrodes 15 detects the induced electric field E3 as a change in the amount of electric charges. Thereafter, the display confirmation is performed by the processing unit 4 similarly to in the already described processing.

Meanwhile, according to the matrix electrode 2, when the user touches the surface of the liquid crystal display device, the amount of electric charges between a pair of electrodes placed around the touched position will change. Accordingly, a possibility arises that a touch of the user is falsely detected as a change in electric field caused by the TFT electrodes in the liquid crystal module 1. In order to prevent this, the uppermost surface of the liquid crystal display device is provided as a shield composed of, for example, a transparent electrode. When thus configured, it is easy to set up the shield. Note that, other than as the uppermost surface, when a shield is provided on a side that is, as viewed from the matrix electrode 2, opposite to the electric field induced in the liquid crystal module 1, it is possible to prevent the amount of electric charges in the matrix electrode 2 from changing due to a factor other than the electric field in the liquid crystal module 1.

Instead, utilizing the fact that the amount of electric charges in the matrix electrode 2 changes when the user touches the surface of the liquid crystal display device, it is allowable to cause the matrix electrode 2 to have a touch panel function. In this case, in order to establish both of the display-content confirming function and the touch panel function in a single matrix electrode 2, such a configuration as shown in FIG. 9 is employed.

Figure 9:
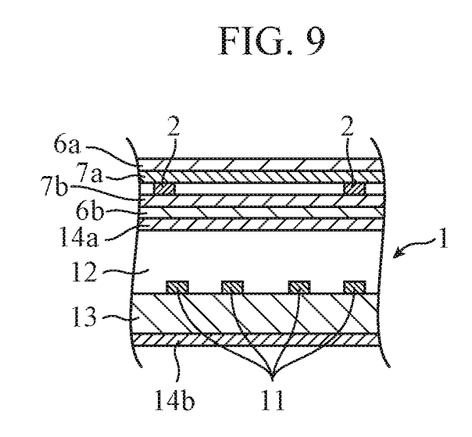
FIG. 9 is a cross-sectional view showing a fourth modified example of the liquid crystal display device according to Embodiment 1 of the invention.

In FIG. 9, on the surface of the liquid crystal module 1, the matrix electrode 2 is provided in a state, for example, where it is sandwiched between shields 6a, 6b composed of transparent electrodes. Adhesive layers 7a, 7b both are provided between the shields 6a, 6b and the matrix electrode 2. When only the surface-side shield 6a is connected to the ground and is thus activated, only the display-content confirming function is validated. When only the other shield 6b is connected to the ground and is thus activated, only the touch panel function is validated. Such activated states of the shields 6a, 6b are switched alternately therebetween, so that the display-content confirming function and the touch panel function are implemented in the single matrix electrode 2.

Instead, it is allowable not to provide the shields 6a, 6b, but to use the matrix electrode 2 as a touch panel in a vertical blanking interval of the liquid crystal module 1 and to use the matrix electrode 2 for display confirmation in the other interval. In the vertical blanking interval, the electric fields induced in the liquid crystal module 1 are stable. When the matrix electrode 2 is used as a touch panel in this interval, it is possible to ensure accuracy of detecting a user's touch.

A configuration in which the matrix electrode 2 is provided on the surface of the liquid crystal module 1 as shown in FIGS. 2A and 2B and FIG. 9, is suited as a configuration for performing display confirmation directed to an already-available liquid crystal module 1. It is also easy to set up the matrix electrode 2.

On the other hand, a configuration in which the matrix electrode 2 is incorporated in the interior of the liquid crystal module 1 as shown in FIGS. 7A and 7B and FIG. 8 makes it possible to form the matrix electrode 2 in the manufacturing process of the liquid crystal module 1, so that a cost reduction effect is promising.

In order to enhance the sensitivity of the matrix electrode 2 for detecting the electric field in the liquid crystal module 1, it is preferred that the image design be well thought out. Specifically, around the display content subject to display confirmation/determination in the processing unit 4, it is preferred to apply such an image design that does not cause an electric field in the liquid crystal module 1 to emerge. For example, in the case of a normally-black liquid crystal module 1 in which a black screen is given when no voltage is applied thereto, a black-colored image design is applied around the display content subject to display confirmation/determination.

In the above description, such a case is shown in which, using the detection signals indicative of the amounts of electric charges between all pairs of electrodes in the matrix electrode 2, the processing unit 4 performs confirmation of a display content. However, the display content may be confirmed only using the detection signals indicative of the amounts of electric charges between the pairs of electrodes that are placed in a region including: a specified position where a display content subject to display confirmation/determination is to be displayed; and an area around that position. Instead, the determination may be performed in such a manner that the matrix electrode 2 shaped to correspond to the display content subject to display confirmation/determination is provided at a position corresponding to a specified position where the display content is to be displayed, to thereby simply compare the detection signal(s) with a threshold value. For example, when the intended display content is a circle mark, the matrix electrode 2 is also shaped into a circle. Then, the processing unit 4 performs the determination, on the basis of how much pairs of electrodes in the matrix electrode 2 that is shaped to correspond to the intended display content, have the amount of electric charges each exceeding a threshold value, or whether the sum of the electric charges given with the pairs of electrodes in the matrix electrode 2 exceeds a threshold value. The threshold value to be compared has been set beforehand, for example, using each amount of electric charges between each pair of electrodes in the matrix electrode 2 that has been actually measured at the time of the operation test, etc. of the liquid crystal display device.

As described above, in accordance with the display confirming device according to Embodiment 1, a detection signal indicative of the amount of electric charges between each pair of electrodes in the matrix electrode 2 that is influenced by the electric field induced in operation of the liquid crystal display, is inputted to the input unit 41; the inputted detection signal is compared in the comparison unit 42 with a detection signal prepared beforehand; and the determination unit 43 determines using the comparison result whether an intended display content is displayed at a specified position on the liquid crystal display. At that time, the pairs of electrodes in the matrix electrode 2 may have a density that is equal to or less than the pixel density of the liquid crystal display, and are not necessarily required that they are placed in one-to-one correspondence with the pixels as in the conventional case. This provides a configuration that is applicable to the liquid crystal display to be provided as a high-luminance or high-resolution one. Accordingly, the display content can be confirmed by using the device with a wide-range liquid crystal display. Further, it is easier to configure the device, as compared with a device using a separate camera or the like as in the conventional case.

Also, the liquid crystal display has the liquid crystal module 1 of a type in which the liquid crystal molecule is switched by being turned in a plane in parallel to the display surface, and the matrix electrode 2 is provided on the surface of the liquid crystal module 1. Accordingly, it is possible to perform display confirmation directed to the already-available liquid crystal module 1 of an IPS type, and it is easy to set up the matrix electrode 2.

Also, the liquid crystal display has the liquid crystal module 1 of a type in which the liquid crystal molecule is switched by being turned in a plane in parallel to the display surface, and the matrix electrode 2 is incorporated in the insulating layer 13 of the liquid crystal module 1. Accordingly, it is possible to form the matrix electrode 2 in the manufacturing process of the liquid crystal module 1 of an IPS type, so that a cost reduction effect is promising.

Also, the liquid crystal display has the liquid crystal module 1 of a twisted nematic type, and the matrix electrode 2 is provided between the TFT electrodes 11, 15 that constitute the liquid crystal module 1 and serve to change the aligned state of the liquid crystal molecules. Accordingly, it is possible to form the matrix electrode 2 in the manufacturing process of the liquid crystal module 1 of a TN type, so that a cost reduction effect is promising.

Also, the liquid crystal display has the liquid crystal module 1 of a type in which the liquid crystal molecule is switched by being turned in a plane in parallel to the display surface; the matrix electrode 2 is provided in a state of being sandwiched by the two shields 6a, 6b, on the surface of the liquid crystal module 1; and the two shields 6a, 6b are alternately placed in an active state. Accordingly, it is possible to establish both of the display-content confirming function and the touch panel function in a single matrix electrode 2.

Also, a shield is provided on a side that is, as viewed from the matrix electrode 2, opposite to an electric field induced in the liquid crystal display. Accordingly, it is possible to prevent the amount of electric charges in the matrix electrode 2 from changing due to a touch of the user.

Also, the liquid crystal display is provided as a meter display. Accordingly, it is possible to confirm whether a display content indicative of each type of warning, such as a charge warning mark, a hydraulic pressure warning mark, an air-bag warning mark, or the like, is normally displayed and presented to the user.

It should be noted that modification of any configuration element in the embodiments and omission of any configuration element in the embodiments may be made in the present invention without departing from the scope of the invention.

INDUSTRIAL APPLICABILITY

As described above, the display confirming device according to the invention is applicable to a wide range of liquid crystal displays, so that it is particularly suited to being used as a device for confirming a display content of a high-luminance or high-resolution liquid crystal display, for example.

REFERENCE SIGNS LIST

1: liquid crystal module, 2: matrix electrode, 3: detection unit, 4: processing unit, 5: display control unit, 6a, 6b: shields, 7a, 7b: adhesive layers, 11: TFT electrode, 12: liquid crystal, 13: insulating layer, 14a, 14b: glasses, 15: TFT electrode, 31: drive, 32: input unit, 33: amplifier, 34: AD converter, 41: input unit, 42: comparison unit, 43: determination unit, 100: processing circuit, 101: memory, 102: CPU.

The invention claimed is:

1. A display confirming device, comprising:
an input processing circuit to which, from a matrix electrode provided for a liquid crystal display, a signal indicative of an amount of electric charges between a pair of electrodes that constitutes the matrix electrode, is inputted;
a comparison processing circuit to compare the signal inputted to the input processing circuit, with a prestored signal indicative of an amount of electric charges between the pair of electrodes measured when displaying has been performed normally by the liquid crystal display; and
a determination processing circuit to determine whether a display on the liquid crystal display is normal or abnormal, using a comparison result by the comparison processing circuit.

2. A liquid crystal display device comprising:
the matrix electrode;
the liquid crystal display; and
the display confirming device according to claim 1.

3. The liquid crystal device according to claim 2,
wherein the liquid crystal display has a liquid crystal module of a type in which liquid crystal molecules are switched by being turned in a plane in parallel to a display surface; and
wherein the matrix electrode is provided on a surface of the liquid crystal module.

4. The liquid crystal display device according to claim 2,
wherein the liquid crystal display has a liquid crystal module of a type in which liquid crystal molecules are switched by being turned in a plane in parallel to a display surface; and
wherein the matrix electrode is incorporated in an insulating layer of the liquid crystal module.

5. The liquid crystal display device according to claim 2,
wherein the liquid crystal display has a liquid crystal module of a twisted nematic type; and
wherein the matrix electrode is provided between electrodes that constitute the liquid crystal module and serve to change an aligned state of liquid crystal molecules.

6. The liquid crystal display device according to claim 2,
wherein the liquid crystal display has a liquid crystal module of a type in which liquid crystal molecules are switched by being turned in a plane in parallel to a display surface;
wherein the matrix electrode is provided in a state of being sandwiched by two shields, on a surface of the liquid crystal module; and
wherein the two shields are alternatively activated.

7. The liquid crystal display device according to claim 2, wherein a shield provided on a side that is, as viewed from the matrix electrode, opposite to an electric field induced in the liquid crystal display.

8. A meter display comprising:
the matrix electrode;
the liquid crystal display; and
the display confirming device according to claim 1.

9. A display confirming method comprising:
inputting, from a matrix electrode provided for a liquid crystal display, a signal indicative of an amount of electric charges between a pair of electrodes that constitutes the matrix electrode, to an input processing circuit;
comparing, by a comparison processing circuit, the signal inputted by the input step, with a prestored signal indicative of an amount of electric charges between the pair of electrodes measured when displaying has been performed normally by the liquid crystal display; and
determining, by a determination processing circuit, whether a display on the liquid crystal display is normal or abnormal, using a comparison result by the comparison step.

10. A display confirming device, comprising:
an input unit to which, from a matrix electrode provided for a liquid crystal display, a signal indicative of an amount of electric charges between a pair of electrodes that constitutes the matrix electrode, is inputted;
a comparator to compare the signal inputted to the input unit, with a prestored signal indicative of an amount of electric charges between the pair of electrodes measured when displaying has been performed normally by the liquid crystal display; and a determiner to determine whether a display on the liquid crystal display is normal or abnormal, using a comparison result by the comparator, wherein a display on the liquid crystal display is verified without using a camera.

* * * * *